Jan. 21, 1964     T. HELMBOLD     3,118,594
METHODS FOR REDUCING FLUID DRAG ON BODIES IMMERSED IN A FLUID
Filed April 21, 1961     3 Sheets-Sheet 1
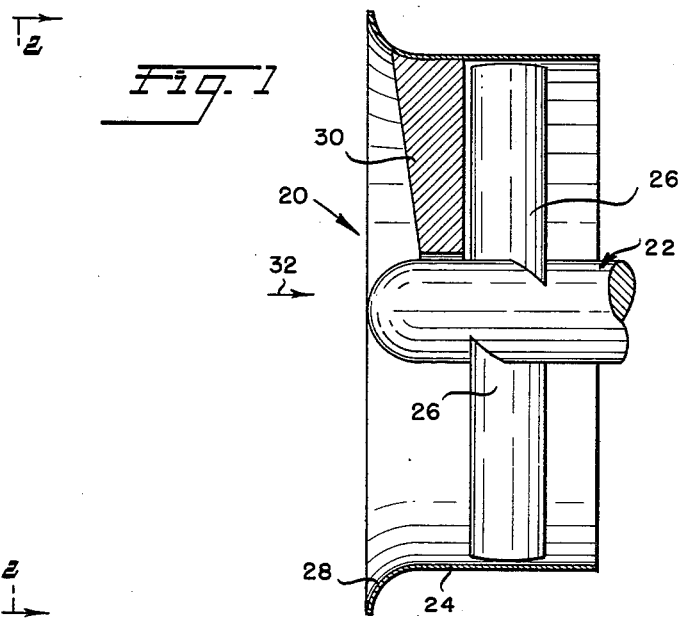
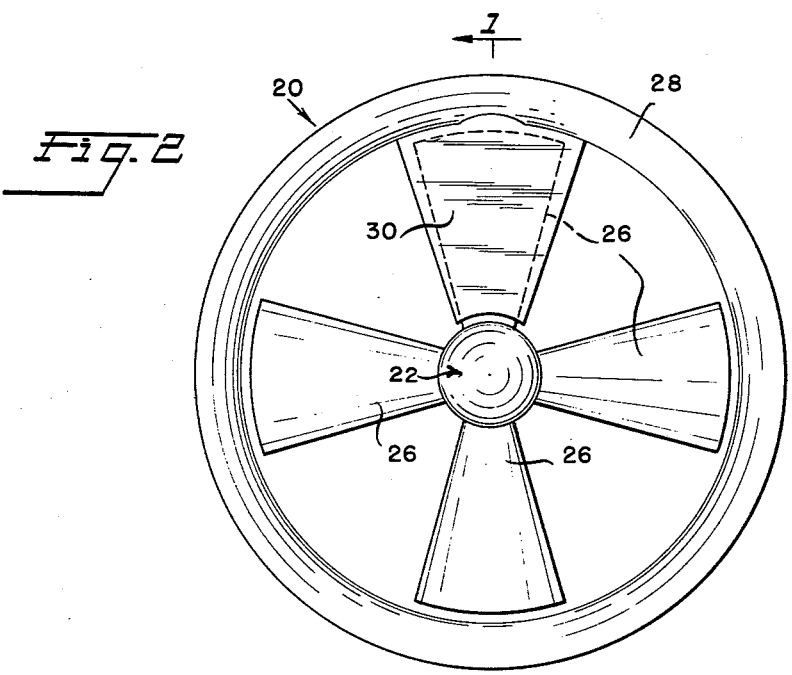
INVENTOR
Theodor Helmbold
BY Strauch, Nolan & Neale
ATTORNEYS Jan. 21, 1964 T. HELMBOLD 3,118,594
METHODS FOR REDUCING FLUID DRAG ON BODIES IMMERSED IN A FLUID
Filed April 21, 1961 3 Sheets-Sheet 2
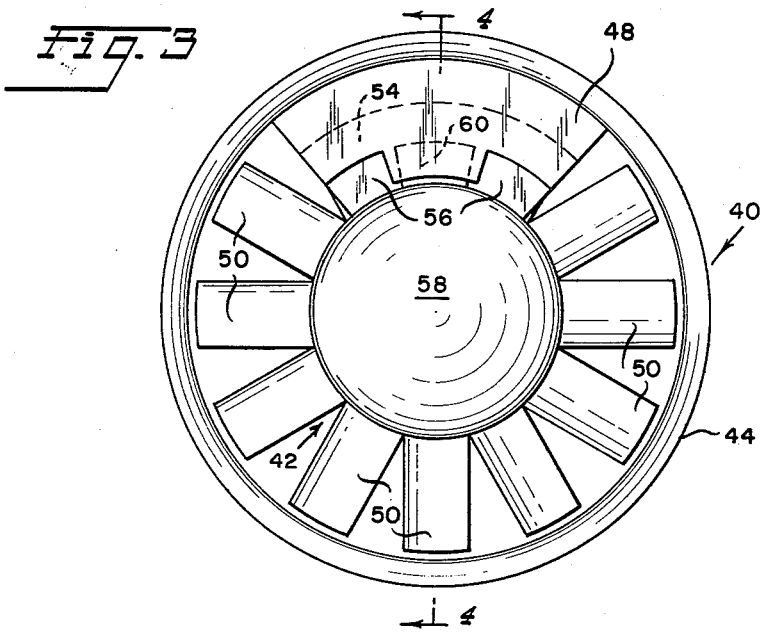
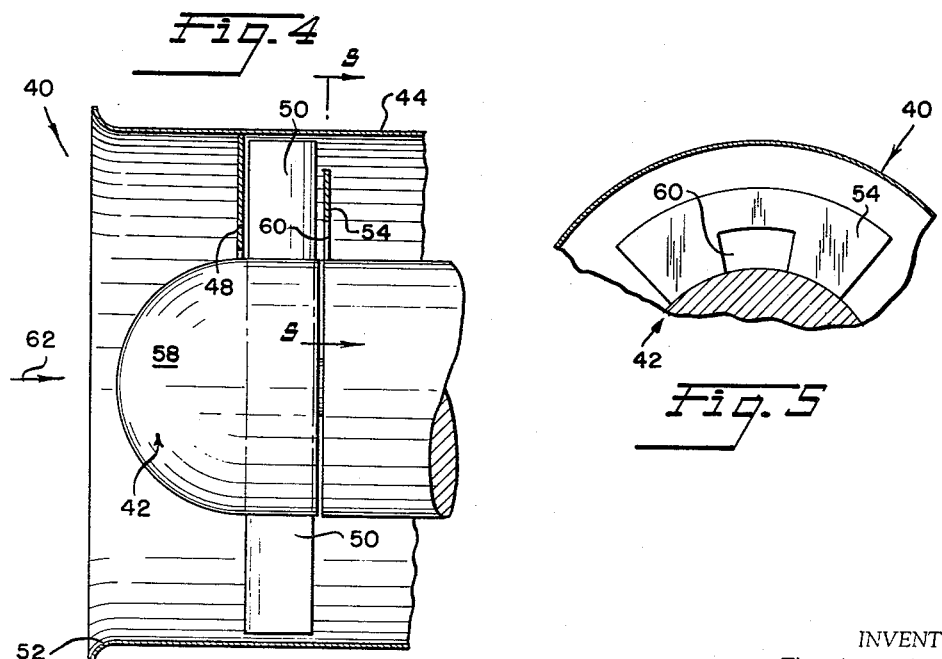
INVENTOR
Theodor Helmbold
BY Strauch, Nolan & Neale
ATTORNEYS
S.N. 104534

INVENTOR
Theodor Helmbold

BY Strauch, Nolan & Neale

ATTORNEYS

United States Patent Office 3,118,594
Patented Jan. 21, 1964

3,118,594
METHODS FOR REDUCING FLUID DRAG ON BODIES IMMERSED IN A FLUID
Theodor Helmbold, Hedwigstr. 4, Munich 2, Germany
Filed Apr. 21, 1961, Ser. No. 104,534
Claims priority, application Germany Apr. 22, 1960
15 Claims. (Cl. 230—120)

The present invention relates to axial and radial flow blowers and, more specifically, to methods of preventing the formation of eddy currents in fluid boundary layer regions existing next to the rotors of axial and radial flow blowers and especially the blades of such rotors.

It is an object of the present invention to provide more efficient axial and radial flow blowers by preventing the formation of drag producing eddies adjacent the surfaces of the blower impellers.

When an immersed body is held stationary in a moving fluid, or is moved through a fluid, a force known as fluid drag acts on the body and requires an opposite and at least an equal force to be applied to the body to hold it in the moving fluid or to maintain its motion therethrough. As a consequence, the efficiency of machines having relatively moving bodies immersed in a fluid is impaired by the presence of fluid drag.

The magnitude of the fluid drag, it has been found, is partially dependent upon the viscous shear in a fluid boundary layer which normally exists next to the surface of the body whenever fluid is forced to flow around the body. The reasons for the formation of such a boundary layer is that velocity of the fluid immediately adjacent to the surface of the body is normally appreciably less than the fluid velocity further away from the body surface.

As the velocity of fluid flow around the body is increased, the loss in energy by particles in the boundary layer is increased as a result of friction drag. When the loss of energy reaches a predetermined magnitude, there is not sufficient energy to move the particles ahead and they are consequently torn away from the body surface by adjacent particles moving over them to cause the formation of eddies or currents of fluid moving contrary to the main current of fluid flowing around the body. This phenomenon increases the magnitude of total drag on the body and consequently reduces the efficiency of a machine having an operative body immersed in fluid and around which fluid is flowing.

It has been proposed to break down the boundary layer on the immersed body to prevent the formation of eddies in the boundary layer region by blowing or sucking the boundary layer away with nozzles or the like. This practice is disadvantageous in that the flow resistance created by fluid flow around the body is usually increased. Also with comparatively small bodies such as blades on blower rotors the practice of blowing or sucking the boundary layer away cannot be effectively utilized.

It is therefore another object of the present invention to avoid the foregoing disadvantages and to eliminate eddies in the fluid boundary layer region existing adjacent the surface of the rotor of an axial or radial flow blower essentially by periodically changing the direction or magnitude, or both, of the relative velocity between the body and the fluid flowing around the body before eddies are formed in the boundary region or before the eddies separate.

By changing the energy in the fluid as by varying its direction or magnitude of flow, or both, the formation of eddies which begin in the boundary layer region are not allowed to develop until the eddies separate. Before the energy-consuming eddy currents are fully developed, or before the body or rotor blade resistance is increased sufficiently to impair efficiency of the blower, the fluid flow, according to the present invention, is reversed or has its magnitude or direction changed sufficiently to cause the incipient destruction or disturbance of the fluid boundary layer next to the rotor blades. After the flow of new magnitude or direction is commenced, the new development of a boundary layer and the tendency to produce new boundary layer eddies begin, but are again inhibited by a further change in magnitude or direction of fluid flow before the eddies fully develop.

Before a boundary layer develops, the effect of friction drag or body resistance of bodies about which flow is taking place is slight, so that the total drag on the body is the result of viscous shear.

Thus, rotor blades in blowers do not require accurate tolerances, thereby making manufacture of the blades more simple and easier to conform to mass production methods.

In order to change the direction in which fluid is passing over the surface of a body, such as a rotor blade, the rotor is arranged to move past a series of nozzles positioned to discharge fluid in different directions such that the rotor blades are successively and alternately exposed to fluid currents passing over the surfaces of the blades in different directions. As a consequence, the fluid boundary layer which is formed by the fluid flowing in each direction is removed together with its eddy formation when the direction of flow is changed.

Another method of causing the incipient destruction of fluid boundary layers according to the present invention is by rotating the blades together with the rotor alternately through zones where fluid flow takes place and zones where there is no fluid flow. In this case, the fluid flowing over the blades always has the same magnitude and direction, but is interrupted at predetermined intervals to cause the formation of the fluid boundary layer to be discontinued each time the blades pass into a zone where there is no fluid flowing. Thus, each time the blades and rotor pass through a zone where there is fluid flow to cause the development of a boundary layer, they then enter a zone where there is no fluid flow, thus causing the discontinuation of the boundary layers which were established.

As previously explained, the fluid boundary layer can be discontinued or destroyed by changing, or, more particularly, by alternately reversing the direction in which the fluid passes over the rotor blades. In an axial blower having a peripherally bladed rotor, this reversal of fluid flow may be accomplished by providing for a fluid guide means which is formed and arranged to guide a mass of the fluid through the blades and then to deflect the fluid mass which has passed through the blades so that it travels back through the blades in the opposite direction. With this arrangement, blades are preferably mounted in the blower rotor for pivotal movement about their longitudinal axes such that the angles of incidence of the blades are adjustable according to the direction of the fluid flow passing through them. Any conventional mechanical driving means may be used for controlling the pivotal movement of the blades. With this pivotal mounting construction for the blades, the blades can be adjusted to the appropriate position by the flow of fluid itself.

An important advantage of the foregoing methods of the invention is that in the period of time before the boundary layer and eddy formation is completed, profiles, such as blower blades, around which fluid flow takes place, are to a large extent unaffected by angular changes in the direction of the flow impinging against and passing over the profiles. As a consequence, the operation of blowers utilizing one of the methods of the present invention is highly efficient over a wide range of speeds of rotation and flow velocities. Consequently, blowers in which the blades pass through fluid currents having different directions can also operate with high efficiency, since in practice only the effect of skin friction is present and the effect of body resistance, which is substantially greater, is absent.

To facilitate an understanding of the novel methods of increasing blower efficiency provided by the present invention, exemplary blowers constructed to function according to these methods are illustrated in the accompanying drawings, in which:

FIGURE 1 is a longitudinal section through an axial flow blower constructed to function in accordance with the principles of the present invention and corresponding to a view taken substantially along line 1—1 of FIGURE 2;

FIGURE 2 is a view of the inlet end of the blower of FIGURE 1 looking substantially in the direction of arrows 2—2 in FIGURE 1;

FIGURE 3 is a view of the inlet end of another axial flow blower constructed to function in accordance with the principles of the present invention;

FIGURE 4 is a longitudinal section through the blower of FIGURE 3 and is taken substantially along line 4—4 of that figure;

FIGURE 5 is a fragmentary section through the blower of FIGURE 3 and is taken substantially along line 5—5 of FIGURE 4;

Figure 6:
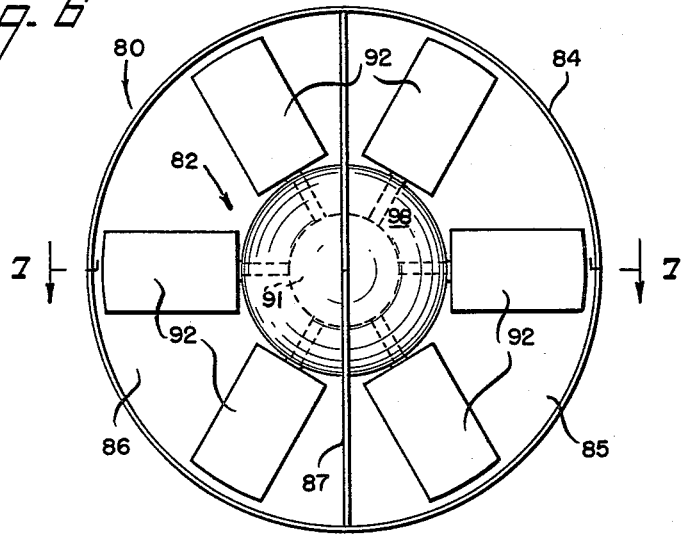
FIGURE 6 is a view of the inlet end of yet another axial flow blower constructed to function in accordance with the principles of the present invention.

It is to be understood that the present invention is not limited to the exemplary illustrated blowers, but resides in novel methods of increasing blower efficiency which are applicable to many different axial and radial flow blowers.

Referring now to the drawings, the exemplary axial flow blower 20 illustrated in FIGURES 1 and 2 includes a casing 24 in which a radially-bladed blower wheel or impeller 22 is rotatably supported in any appropriate manner. Fixed in blower casing 24 between the blades 26 of impeller 22 and the inlet end 28 of the casing is a stationary wedge-shaped body or baffle 30 of slightly greater width than the blades 26.

The rotating impeller 22 draws air into the inlet end 28 and through the blower casing in the direction of the arrow 32 of FIGURE 1. Thus, little if any air flows through the blower casing through the region behind baffle 30. The flow of fluid over blades 26 is therefore interrupted at predetermined intervals, resulting in the periodic destruction of the incipient boundary layers forming around the blades. As a result, the formation of boundary layer eddies adjacent the blades 26 of impeller 22 is prevented.

The axial flow blower 40 illustrated in FIGURES 3-5 is similar in appearance to the blower 20 of FIGURES 1 and 2 and includes a radially-bladed blower wheel or impeller 42 rotatably mounted in a blower casing 44. A first stationary baffle or body 48 is supported in casing 44 between the leading edges of the blades 50 of impeller 42 and the inlet end 52 of the blower casing. A second stationary baffle or body 54 is supported adjacent the trailing edges of blades 50 on the outlet side of the impeller. As is best shown in FIGURE 3, spaced apart recesses 56 are formed in baffle 48 adjacent the shaft 58 of impeller 42 to direct a controlled flow of fluid through the baffle. A similar recess 60 is formed in baffle 54 and is, looking normal to the direction of flow (see FIGURE 3), located between the recesses 56 in baffle 48.

Air flowing into blower 40 in the direction of the arrow 62 is drawn through the recesses 56 in baffle 48 and then directed radially outward in the region between baffles 48 and 54.

A further radial outward flow is developed by inducing air through the recess 60 in baffle 54 and then directing it radially outward between baffles 48 and 54. The radial flow thus developed in the region between baffles 48 and 54, having a different direction than the air flowing axially through the blower in the non-baffled portion of the blower casing, substantially as shown by arrow 62, destroys the incipient boundary layer tending to form on the surfaces of the impeller blades 50 as they rotate through the unbaffled region of the blower 40.

Destruction of the boundary layers adjacent the surfaces of the impeller blades 26 and 50 in the blower embodiments described above produces an increase in blower efficiency which more than offsets the decrease in flow cross section resulting from the baffling arrangements, providing a substantial net increase in blower efficiency. Furthermore, the impeller blades of blowers constructed in the manner described above are largely unaffected by angular changes in the direction of the fluid flowing over them so that such blowers remain highly efficient over a wide range of speed of rotation, adding significantly to their versatility.

A further advantage of the present invention, resulting from the elimination of the boundary layer, is that the impeller blades need not be manufactured to the close tolerance necessitated by prior art axial and radial flow blower constructions, providing a substantial decrease in the cost of manufacturing such blowers.

Figure 7:
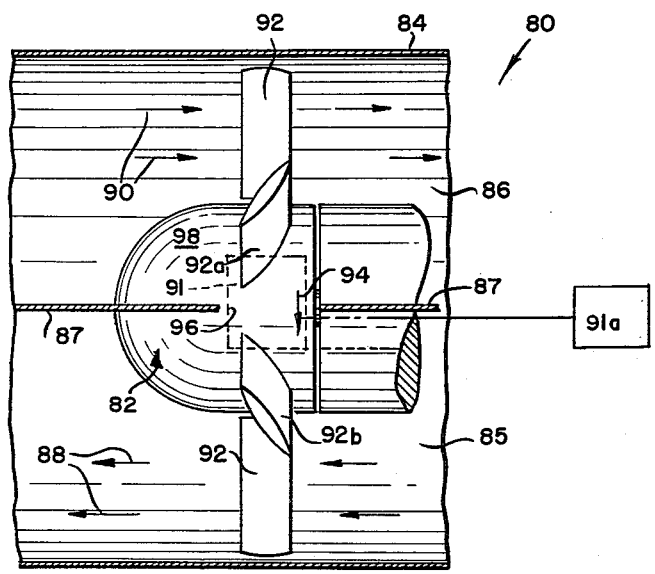
FIGURE 7 is a plan view of the blower of FIGURE 6 with a portion of the blower casing removed to show the arrangement of the internal components, and corresponding to a view taken substantially along line 7—7 in FIGURE 6.

The blower 80 illustrated in FIGURES 6 and 7 includes a radially-bladed blower wheel or impeller 82 rotatably mounted in a blower casing 84 which is divided into two channels or chambers 85 and 86 by appropriate guide means, for example, a partition 87 extending parallel to the flow paths indicated by arrows 88 and 90 in FIGURE 7.

The blades 92 of impeller 82 are mounted on impeller shaft 98 for pivotal movement about their longitudinal axes by schematically indicated adjusting means 91 of appropriate construction actuated by a cam-operated switch or similar actuator generally indicated at 91a. The adjusting mechanism 91 is arranged so that as the impeller 82 rotates in the direction indicated by arrow 94 in FIGURE 7, the blades 92, as they pass through aperture 96 in partition 87, are adjusted from the position of blade 92a to the position of blade 92b. Then, as blades 92 again pass through partition 87 one-half revolution later, they are pivoted back by the mechanism 91a, 91 to the position indicated by reference character 92a. As the result, two independent flow streams are formed in blower casing 84, one of the streams flowing in chamber 85 in the direction indicated by arrows 88, and the other in chamber 86 in the direction indicated by arrows 90.

As a result, blades 92, in each revolution, pass through two streams of fluid flowing in opposite directions. The period for which the blades remain in each stream is so short that boundary layers cannot develop to an extent that eddy formation and separation will occur.

The two streams of flowing fluid may be united by an appropriate system of interconnecting conduits (not illustrated) or, alternatively, either of the streams may be returned through impeller 82 providing a two-stage blower Blower 80, since it operates in accordance with the principles of the present invention, will have the same advantages as blowers 20 and 40 including increased efficiency, the permissive use of relatively small impeller blades, and the ability to employ blades manufactured to much coarser tolerances than has heretofore been possible.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of increasing the operating efficiency of axial and radial flow blowers having rotating impeller blades, comprising the steps of providing at least two zones of dissimilar fluid flow in the region through which the blades pass, and periodically altering from one zone to the other the relative vectorial velocity between the blades and the flowing fluid at temporal intervals sufficiently short to prevent the formation and subsequent detachment of eddy currents in the boundary layers of the fluid, whereby turbulence in the layers adjacent the blades is prevented so that the efficiency of the blower is increased.

2. A method according to claim 1, wherein said relative vectorial velocity is altered by changing the direction of the fluid flowing in one of said zones.

3. A method according to claim 1, wherein said relative vectorial velocity is altered by changing the magnitude of the velocity of the fluid flowing in one of said zones.

4. A method according to claim 1, wherein said relative vectorial velocity is altered by changing both the direction and the velocity of the fluid flowing in one of said zones.

5. A method according to claim 1, wherein said relative vectorial velocity is altered by alternately passing the blades through said zones, the fluid flowing in one zone and being quiescent in the other.

6. A method according to claim 1, wherein said relative vectorial velocity is altered by alternately passing the blades through said zones, the fluid flowing in opposite directions in said zones.

7. A method according to claim 6, further comprising the step of pivoting the blades relative to their supporting structure as they pass from one zone into the other, so as to maintain them at a constant angle of attack relative to the respective directions of fluid flow in said zones.

8. An axial blower for a flowing medium comprising a hollow casing, an impeller having a plurality of blades rotatably supported within said casing, and means in said casing for periodically altering the relative vectorial velocity between said blades and said flowing medium at temporal intervals sufficiently short to prevent the formation of eddy currents and turbulence in the boundary layers of said medium.

9. An axial blower according to claim 8, wherein said altering means comprises a stationary baffle member having a width slightly greater than that of one of said blades.

10. An axial blower according to claim 9, wherein said baffle member is secured to said casing intermediate said blades and the inlet end of said casing, and closely adjacent said blades.

11. An axial blower according to claim 8, wherein said altering means comprises a first baffle member secured to said casing intermediate said blades and the inlet end of said casing, and a second baffle member secured to said impeller intermediate said blades and the outlet end of said casing, said first and said second baffle members being closely adjacent said blades but spaced apart from one another.

12. An axial blower according to claim 11, wherein at least said first baffle member has an arcuate shape closely hugging said impeller, said baffle members having each at least one recess therein, the recesses of said first baffle member being displaced with respect to those of said second baffle member.

13. An axial blower according to claim 12, wherein said second baffle member has an arcuate shape similar to that of said first baffle member but somewhat smaller in size, said first baffle member having two recesses in close proximity to said impeller and in flanking relationship to a single recess provided in said second baffle member.

14. An axial blower according to claim 8, wherein said altering means comprises a partition in said casing providing two channels in which said medium flows in opposite directions, said partition having therein an aperture through which said blades pass, and adjusting means for maintaining said blades at a constant angle of attack relative to the respective directions of said medium in said channels.

15. An axial blower according to claim 14, wherein said adjusting means is adapted to turn each of said blades consecutively with their respective leading edges against the direction of the medium in both of said channels, further comprising actuator means for controlling said adjusting means in dependence from the rotation of said impeller.

References Cited in the file of this patent

UNITED STATES PATENTS

| 1,383,719 | Halvorsen et al. | June 5, 1921 |
| 2,575,682 | Price | Nov. 20, 1951 |
| 2,689,681 | Sabatink | Sept. 21, 1954 |

FOREIGN PATENTS

| 25,453 | Netherlands | Oct. 16, 1931 |
| 116,879 | Switzerland | Sept. 16, 1926 |
| 204,957 | Switzerland | Aug. 1, 1939 |
| 225,767 | Australia | Dec. 4, 1959 |
| 357,371 | Great Britain | Sept. 24, 1931 |
| 733,691 | France | July 12, 1932 |
| 742,788 | Germany | Dec. 16, 1943 |
| 1,070,336 | Germany | Dec. 3, 1959 |

OTHER REFERENCES

German printed application 1,064,191, Aug. 27, 1959.